UNITED STATES PATENT OFFICE.

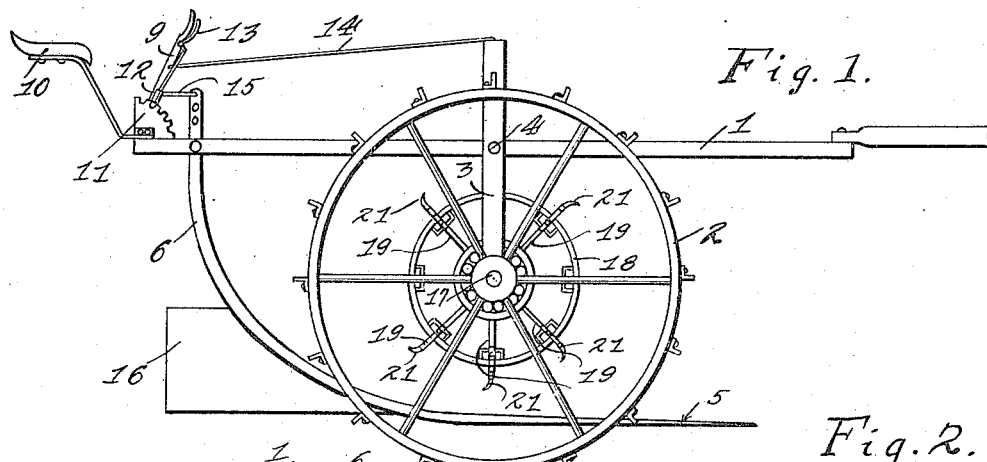

FREDERICK WRIGHT, OF SUMMERSIDE, PRINCE EDWARD ISLAND, CANADA.

POTATO-DIGGER AND PULVERIZER.

1,229,372.  Specification of Letters Patent.  Patented June 12, 1917.

Application filed July 16, 1915, Serial No. 40,313. Renewed November 27, 1916. Serial No. 133,811.

*To all whom it may concern:*

Be it known that I, FREDERICK WRIGHT, a subject of the King of England, residing at Summerside, Prince Edward Island, Dominion of Canada, have invented certain new and useful Improvements in Potato-Diggers and Pulverizers; and I do hereby declare the following to be a full, clear, and exact description of the invention, such as will enable others skilled in the art to which it appertains to make and use the same.

This invention relates to a potato digger and pulverizer.

An object of the invention resides in the provision of a device by means of which potatoes or other similar vegetables may be dug from the ground.

A further object of the invention resides in so constructing the device that it may be used as a soil pulverizer to perform the work usually performed by a harrow.

With these and other objects in view, such as will appear as the description progresses, my invention comprises the combination and arrangement of parts as set forth in and falling within the scope of the appended claims.

Referring to the drawing:

Figure 1 is a side elevation of my device.

Fig. 2 is a plan view thereof.

Fig. 3 is a front elevation.

Fig. 4 is a detail showing the braces on the plow share which are used in heavy ground.

Referring to the drawing wherein like parts are indicated by like characters throughout the several views:—

In the embodiment of my invention shown in the drawing, I have provided a frame 1 which is rectangular in formation and which is supported by a pair of wheels 2, the wheels being mounted on an inverted U-shaped axle 3. This axle is pivoted, as at 4, to the frame 1 so that it may be swung backwardly or forwardly to change the positions of the wheels.

Mounted on the frame 1 is a digging mechanism which consists of a plow share 5 from which a pair of arms 6 extend upwardly above the frame. This plow share has a pair of spaced points 7 which are separated by a V-shaped opening 8. These arms 6 are pivotally mounted on the frame 1.

In order that the wheels 2 and the digging mechanism may be raised or lowered, simultaneously, I have provided a controlling lever 9 which is mounted on the frame 1 adjacent the operator's seat 10. This lever 9 coöperates with a quadrant rack 11 and is maintained in place thereon by a spring pressed pawl 12 controlled by a handle 13 on the lever 9. Pivotally secured to this lever 9 and extending forwardly therefrom is a rod 14 which is pivotally secured at its forward end to the axle 3. Extending from this lever is a connecting rod 15 which is adjustably connected to the upper end of one arm 6. It will thus be seen that when the lever 9 is moved in either direction the digging mechanism and the wheels will be simultaneously adjusted through the rods 14 and 15. Secured to the plow share 5 is a plurality of spaced vertically extending plates 16, the purpose of which will later appear.

Rotatably mounted on a rod 17 is a circular frame 18 which has a plurality of outwardly extending arms 19 thereon. On the outer ends of these arms are formed cross bars 20 which extend transversely of the machine and on which are formed fingers 21 which operate above the plow share. This frame 18 is mounted on ball-bearings which are interposed between the frame and the rod 17. It is of course to be understood that as the wheels 2 are adjusted the frame 18 carrying the fingers 21 will likewise be adjusted to maintain the proper relationship between these fingers and the plow share.

In Fig. 4 of the drawing, I have shown a plow share and arms which form the digging mechanism as braced by a plate 22 which has a hole 23 therein. This plate is used when heavy ground is being encountered so as to brace the plow share and arms.

Now when the device is being used for digging potatoes they will be dug from the ground by the plow share and will pass upwardly thereon, will be freed from the dirt by the rotating fingers 21 and will be deposited in the rear of the machine in rows by the plates 16 so that they may be easily gathered.

Now when the machine is being used to pulverize the soil, the soil will pass upwardly over the plow share and will be disintegrated by the fingers 21. The particular formation of the share will cause the weeds to ride back in the V-shaped opening therein and thus be effectively cut.

From the foregoing description it will be seen that I have provided a very simple machine, which may be used to gather vegetables such as potatoes or for the pulverizing of the soil.

While I have illustrated and described a particular embodiment of my invention, I have merely done so for the sake of convenience and I do not wish to be limited to that particular embodiment as it is obvious that numerous changes may be made within the details of construction thereof without in any way departing from the spirit of the invention or exceeding the scope of the appended claims.

What I claim is:—

1. In a machine of the class described, the combination with a frame, of an axle pivotally mounted thereon, wheels on the said axle, a digging mechanism pivotally mounted on the frame and means for simultaneously adjusting the axle and digging mechanism.

2. In a machine of the class described, the combination with a frame, of a digging mechanism mounted thereon, the said mechanism including a plow share having a V-shaped opening therein and a plurality of vertically extending spaced plates projecting from the rear thereof, arms extending upwardly from said share, a lever mounted on said frame and a rod connecting the lever and one of the said arms.

3. In a machine of the class described, the combination with a frame, of a digging mechanism pivotally mounted thereon, an axle pivotally mounted on the frame, wheels on the said axle, a frame rotatably mounted on the first mentioned frame and having a plurality of fingers thereon, means for simultaneously adjusting the digging mechanism, the wheels and the said last mentioned frame.

4. In a machine of the class described, the combination with a frame, of a digging mechanism mounted thereon, the said mechanism including a plow share and a plurality of spaced plates extending rearwardly therefrom, a circular frame rotatably mounted on the first mentioned frame and having a plurality of fingers adapted to move above the said plow share and means for simultaneously adjusting the said digging mechanism and the circular frame to vary the distance between the same.

In testimony whereof, I affix my signature, in the presence of two witnesses.

FREDERICK WRIGHT.

Witnesses:
WINSTON J. LIDSTONE,
HENRY P. STRONG.